United States Patent [19]

Coleman

[11] Patent Number: 4,572,443
[45] Date of Patent: Feb. 25, 1986

[54] MEAT SHREDDER

[76] Inventor: Herby Coleman, Fountain of Youth, #282, Rte. 1 Box 12, Niland, Calif. 92257

[21] Appl. No.: 701,545

[22] Filed: Feb. 14, 1985

[51] Int. Cl.⁴ ............................................. B02C 43/25
[52] U.S. Cl. .................................. 241/166; 241/273.2; 241/283
[58] Field of Search ................... 241/273.2, 273.1, 94, 241/166, 283

[56] References Cited

U.S. PATENT DOCUMENTS

| | | | |
|---|---|---|---|
| 69,150 | 9/1867 | Worden | 241/273.1 |
| 185,184 | 12/1876 | Markey et al. | 241/273.2 X |
| 1,527,087 | 2/1925 | Schulman | 241/166 |
| 3,831,866 | 8/1974 | Phillips | 241/283 X |

*Primary Examiner*—Mark Rosenbaum
*Attorney, Agent, or Firm*—Charmasson & Holz

[57] ABSTRACT

A meat-shredding apparatus to be used in the preparation of filling for sandwiches, tacos, burritos and the like, which comprises a comminuting surface, having vertical parallel rows of sharpened teeth, slideably mounted on side rails secured to an inclined frame, a set of pivotally-connected arms which transmit the up and down movement of a hand lever to the comminuting surface, a hopper for holding meat to be shredded, said hopper being rigidly attached to said frame and having its inner open end facing the cutting side of said comminuting surface, and a pair of crenellate-edged wiping plates pivotally mounted under spring tension on said hopper for freeing shreds of meat which become jammed between the teeth of said comminuting surface.

8 Claims, 6 Drawing Figures

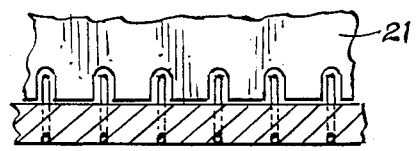
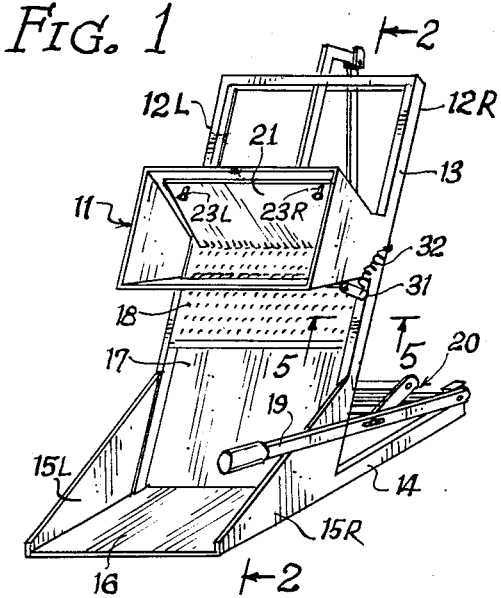
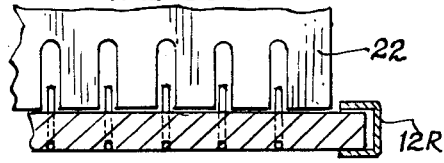
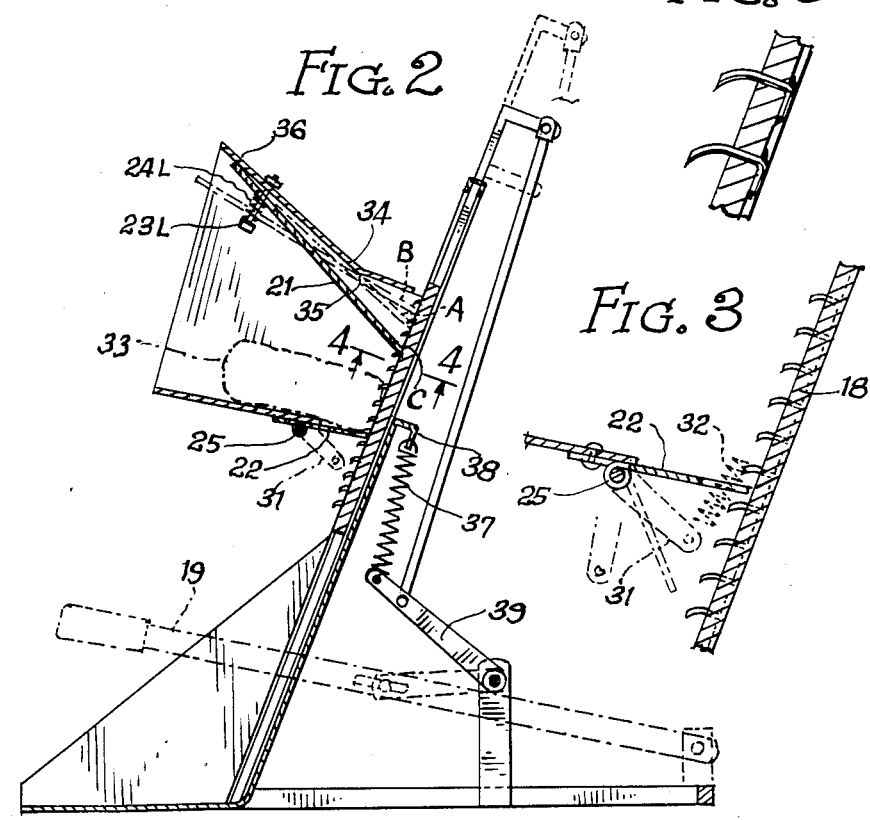

MEAT SHREDDER

FIELD OF THE INVENTION

The present invention relates to shredders and graters having reciprocating comminuting surfaces which are self cleaning.

BACKGROUND OF THE INVENTION

During the past decade, the number of restaurants selling authentic mexican-style food has increased dramatically. Shreaded meat is used extensively in such food, and the shredding has heretofore been done manually. As a result of the burgeoning Mexican food business, there now exists a commercial demand for a compact, reliable, low-cost meat shredder capable of producing uniformly-shredded meat filling for tortas (sandwiches), tacos and burritos. Ideally, such a shredder would have a self-cleaning comminuting surface and a means to prevent the cleaning mechanism from jamming if a bone fragment or rigidly trapped meat shred is encountered.

There is much prior art in the field of shredding and grating devices. U.S. Pat. No. 69,150, issued to C. Worden on Sept. 24, 1867, discloses a nutmeg grater comprising a reciprocating comminuting surface slideably mounted between the side rails of a vertically-inclined frame. U.S. Pat. No. 3,831,886, issued to Duane Phillips on Aug. 27, 1974, discloses a cheese grater having a reciprocating comminuting surface. A U.S. Pat. No. 3,709,441 issued to Hans Hessner on Jan. 9, 1973 discloses a machine for disintegrating cellulose pulp sheets. This machine is of interest because of the comb plates which sweep and clean the parallel rows of teeth on the comminuting surface.

SUMMARY OF THE INVENTION

The present invention has been developed to meet the relatively recent need for a compact, reliable, inexpensive meat shredding machine. The design comprises a comminuting surface, having vertical parallel rows of sharpened teeth, slideably mounted on side rails secured to an inclined frame, a set of pivotally-connected arms which transmit the up and down movement of a hand lever to the comminuting surface, a hopper for holding meat to be shredded, said hopper being rigidly attached to said frame and having its inner open end facing the cutting side of said comminuting surface, and a pair of wiping plates having crenellate-shaped comb edges pivotally mounted under spring tension on said hopper for freeing shreds of meat which become jammed between the teeth of said comminuting surface.

BRIEF DESCRIPTION OF THE DRAWINGS

FIG. 1 is a perspective view of the shredder;

FIG. 2 is a cross-sectional view of the shredder, taken along line 2—2 of FIG. 1;

FIG. 3 is a partial cross-sectional view of the shredder showing the hinged operation of the lower wiping plate;

FIG. 4 is a detail view of the crenellate edge of the upper wiping plate intermeshed with the teeth of said comminuting surface;

FIG. 5 is a detail view of the crenellate edge of the lower wiping plate intermeshed with the teeth of said comminuting surface; and FIG. 6 is a detail view of two of the curved teeth of the comminuting surface.

DESCRIPTION OF THE PREFERRED EMBODIMENT OF THE INVENTION

Referring now to FIG. 1, a hopper 11 for holding the meat to be shredded is rigidly affixed to the nearly vertical right and left members, 12R and 12L respectively, of an inclined frame 13. Both members have a U-shaped cross-section. Said inclined frame 13 is gusseted to a horizontal frame 14 by means of left gusset 15L and right gusset 15R. A bin for collecting shredded meat is formed by gussets 15L and 15R, horizontal plate 16 and inclined plate 17. A comminuting surface 18, studded with vertically-parallel rows of sharpened teeth, is slideably installed within the guides of U-shaped cross section formed by said nearly vertical members 12R and 12L. Up and down movement of hand lever 19 is transmitted via a system of pivotally-linked levers 20 to comminuting surface 18. Upper crenellate-edged wiping plate 21 is pivotally mounted on hopper 11. The crenellated edge of upper wiping plate 21 dislodges shreds of meat as the comminuting surface 18 moves in an upward direction. Pivotal mounting thereof avoids the tendency for it to jam when a bone chip or rigidly-trapped shred is encountered. A lower crenellate-edged wiping plate 22, also pivotally mounted on hopper 11, dislodges shreds of meat as the comminuting surface 18 moves in an upward direction.

Referring now to FIG. 2, a side view of the system of pivotally-linked levers 20 which connects hand lever 19 to comminuting surface 18 is more clearly seen. In order to neutralize the gravitational force on the nearly-vertical comminuting surface 18, compensating expansion spring 37 is connected between frame flange 38 and the end of lever 39, one of the levers in system 20. Retaining screws 23L and 23R and compressed retaining springs 24L and 24R comprise the pivotal mounting means for upper wiping plates 21, while hinge joint 25 comprises the pivotal mounting means for lower wiping plate 22.

The spring-loaded mounting of upper wiping plate 21, combined with the geometry of the roof 34 of hopper 11 allows the pivoting axis of plate 21 to change depending on the direction of travel of comminuting surface 18, as diagrammatically shown in FIG. 2. During the upward movement of comminuting surface 18, wiping plate 21 is normally resting in its stable position A, where it dislodges into hopper 11 any shred of meat carried by the upper movement of the teeth. Should a piece of bone or other solid material be carried by the teeth, plate 21 will pivot at at ridge fulcrum 35 formed by the convex angle of hopper roof 34. The maximum travel of plate 21 when pivoting on ridge fulcrum 35 is limited by retaining screws 34. The resisting torque exerted by spring 24 will be quite strong so that only solid material—not shredded meat—will force the plate to position B, where it less effectively cleans comminuting surface 18. During the downward movement of comminuting surface 18, any interfering object carried by the teeth will cause the outer edge 36 of wiping plate 21 to pivot against the roof 34 of hopper 11, with springs 24 serving as the fulcrum, and retaining screws 23 serving as a stop to limit travel. The plate may assume a maximally-displaced position C, with springs 24 offering a much lesser torqing resistance to plate movement than before due to the short distance between retaining screws 23 and the pivoting edge 36 as compared with the distance between retaining screws 23 and ridge 35. Thus, not only hard obstructing particles, but also softer ones such as processed meat shreds, which may be carried above the upper edge of hopper 11 will be allowed to reenter hopper 11.

FIG. 3 shows the detail of the hinge joint pivotal mounting means for lower wiping plate 22. A tension lever 31 is rigidly affixed to lower wiping plate 22, and low-tension spring 32 provides a torque loading for maintaining lower wiping plate 22 in its wiping position. On the downward stroke of comminuting surface 18, shreds of meat are torn from meat chunk 33 by the teeth and remain adhered to comminuting surface 18. Lower wiping plate 22 simultaneously swings down to glide over the adhered meat shreds. On the upward stroke of comminuting surface 18, lower wiping plate 22 returns to its horizontal home position where its crenellated edge fills the spaces between the rows of teeth on comminuting surface 18, as best illustrated in FIG. 5, dislodging the meat shreds which have remained adhered to comminuting surface 18 and allowing them to fall to plate 16.

FIG. 4 shows the detail of the crenellated-edge of upper wiping plate 21 cleaning the space between six vertical rows of teeth on comminuting surface 18 in a manner similar to the one employed by lower wiping plate 22.

Thus, any particle of meat shredded by the upward movement of the teeth against meat chunk 33 will be wiped from the teeth of the comminuting surface 18 and deposited in hopper 11, where it will be carried to a point where lower wiping plate 22 will cause it to fall to plate 16.

FIG. 5 shows the detail of the crenellated edge of lower wiping plate 22 cleaning the space between five vertical rows of teeth on comminuting surface 18. A cross section of nearly vertical right member 12R is visible.

FIG. 6 shows the detail of tooth construction.

What is claimed is:

1. An apparatus for shredding fibrous substances which comprises:
   a main support frame;
   parallel rails secured to said main support frame;
   a comminuting surface having parallel rows of teeth and slideably mounted on said rails;
   said teeth being shaped and sharpened to shred in only one direction;
   a hand lever capable of vertical oscillatory movement;
   means for transmitting said vertical oscillatory movement to said comminuting surface;
   a hopper for holding meat to be shredded, said hopper being rigidly attached to said frame and having its inner open end facing said comminuting surface;
   at least one comb-edged wiping plate pivotally and resiliently mounted on the inner open end of said hopper;
   said plate being biased to clear the passage of shredded substance when said comminuting surface moves in said one direction, and to wipe pieces of substance caught between the teeth of said comminuting surface with its moves in the opposite direction.

2. The apparatus of claim 1 wherein said vertical oscillatory movement transmitted to said comminuting surface has two vertical movement limits;
   said inner open end has a first inner edge and a second inner edge being perpendicular to said one direction;
   said first inner edge being most proximate to the movement limit of said comminuting surface in said one direction; and
   said second inner edge being most distant to said movement limit.

3. The apparatus of claim 2 wherein a first of said comb-edged wiping plates is positioned along said first inner edge of said hopper, said first wiping plate being biased to allow said shredded substance to pass beneath its comb edge as the teeth of said comminuting surface carry it in said one direction beneath its comb edge as said substance leaves said hopper, and to prevent the reentry of said substance into said hopper as said substance moves with said comminuting surface in the opposite direction.

4. The apparatus of claim 3 wherein a second of said comb-edged wiping plates is positioned along said second inner edge of said hopper, said second wiping plate being biased to allow said shredded substance to pass beneath its comb edge as the teeth of said comminuting surface carry it in said one direction beneath its comb edge as said substance enters said hopper, and to prevent the exit of said substance from said hopper as said substance moves with said comminuting surface in the opposite direction.

5. The apparatus of claim 4 which further comprises means for alternately pivoting said second wiping plate on a first and second fulcrum, said second wiping plate having variable biasing means to that so that pivoting on said first fulcrum occurs only when obstructions of unusually stiff composition are encountered by the comb-edge of said second wiping plate as said comminuting surface moves in the direction opposite to said one direction, and pivoting on said second fulcrum occurs to allow passage of said shredded substance into said hopper.

6. The apparatus of claim 5 wherein said variable biasing means comprises at least one retaining spring which resiliently holds said second wiping plate at a point between said first fulcrum and the edge of said second wiping plate opposite its comb edge against the roof of said hopper.

7. The apparatus of claim 6 wherein said first fulcrum comprises a ridge on the inside of said roof of said hopper.

8. The apparatus of claim 7 wherein said second fulcrum comprises said at least one retaining spring.

* * * * *